(12) United States Patent
Lee

(10) Patent No.: US 6,739,055 B2
(45) Date of Patent: May 25, 2004

(54) ROTATABLE TUBE CUTTER

(76) Inventor: Tai-Hung Lee, No. 53, Lane 59, San-Ming 2nd Street, Dali City, Taichung Hsien (TW)

( * ) Notice: Subject to any disclaimer, the term of this patent is extended or adjusted under 35 U.S.C. 154(b) by 0 days.

(21) Appl. No.: 10/320,443

(22) Filed: Dec. 17, 2002

(65) Prior Publication Data

US 2004/0025351 A1 Feb. 12, 2004

(30) Foreign Application Priority Data

Aug. 9, 2002 (TW) .......................................... 091212478
Nov. 5, 2002 (TW) .......................................... 091217882

(51) Int. Cl.[7] .............................. B26D 3/16; B23D 21/06
(52) U.S. Cl. ............................... 30/98; 30/101; 30/102
(58) Field of Search .......................... 30/101, 102, 95, 30/96, 97, 98, 99

(56) References Cited

U.S. PATENT DOCUMENTS 3,145,469 A * 8/1964 Thorvald ..................... 30/102
3,403,442 A * 10/1968 Reese et al. ............. 30/164.95
4,305,205 A * 12/1981 Girala .......................... 30/102
5,515,609 A * 5/1996 Sperti .......................... 30/101
6,481,105 B1 * 11/2002 Haung .......................... 30/98

* cited by examiner

Primary Examiner—Charles Goodman
(74) Attorney, Agent, or Firm—Rosenberg, Klein & Lee

(57) ABSTRACT

A rotatable tube cutter for cutting a tube-like work piece is disclosed. This rotatable tube cutter mainly comprises a fixing portion, a rotatable portion, a cutting blade assembly, and a feeding assembly. By rotating a feeding knob, the feeding amount can be easily controlled. So, this invention is easy to operate by one hand. It is able to work in a limited available space via repeating lift and press movements. It is possible to work in the traditional full circle rotation method. And, it has manual and automatic dual feeding modes.

5 Claims, 9 Drawing Sheets

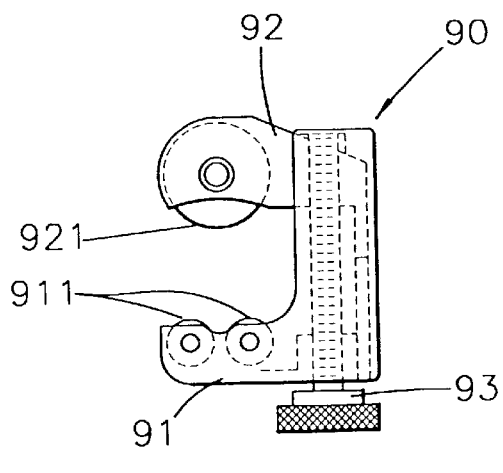
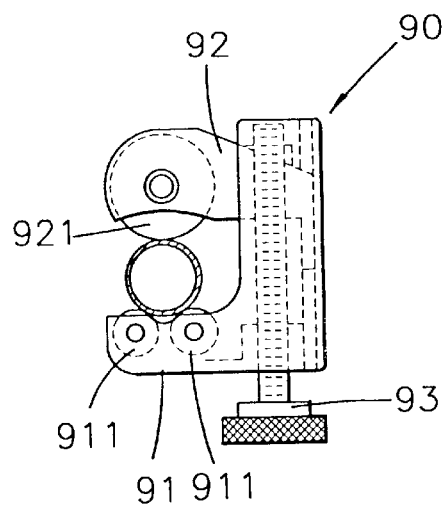
FIG. 1 (PRIOR ART)
FIG. 2 (PRIOR ART)
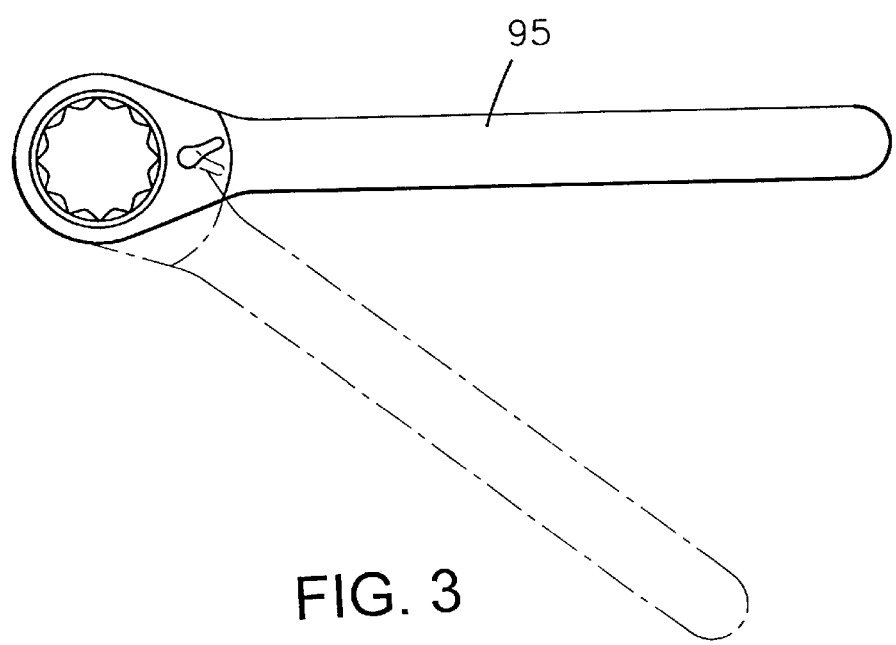
FIG. 3 (PRIOR ART)

ROTATABLE TUBE CUTTER

BACKGROUND OF INVENTION

1. Field of the Invention

This invention relates to a rotatable tube cutter. More specifically, the invention relates to a rotatable tube cutter for cutting metal tube or the like. It is easy to operate by one hand. It is able to work in a limited space. It is possible to work by the traditional full circle rotation method. Plus, it has manual and automatic dual feeding modes.

2. Description of the Prior Art

A metal tube can be cut by many methods. If this metal tube is movable and made by a harder metal like steel, usually it can be cut by a saw or by a traditional cutting machine. But, if the tube is fixed on the wall of a building, especially for the copper tube of ventilation and heater systems, the user will face the following problems:

First, the work piece (the copper tube) is fixed near the corner of the ground (or ceiling) and the wall. In this case, not only the work piece cannot move, but also the available space around the work piece is quite limited. The user only can bring a hand tool to cut this fixed work piece. However, if the user wants to rotate the hand tool to cut it, there must be a larger space.

Second, such work piece made by copper is softer than steel's one. It is easy to deform. If a small area of the work piece is hit or punched by an unintentional heavy force, the work piece will deform immediately. Once the cutting edge of work piece is deformed (become non-circular), it cannot connect with other tube that has a circular edge. That means it becomes useless. Therefore, it is impossible to cut the work piece by using a traditional cutting tool.

Referring to FIGS. 1 and 2, a work piece 80 (a thin copper tube) is fixed on a wall of a building. Under such limited space, only a traditional mini tube cutter 90 can be used. This portable mini tube cutter 90 mainly comprises a fixing base 91, a movable base 92 that can slide on the fixing base 91, and a rotatable knob 93 that can control the position of the movable base 92. The fixing base 91 has two rolling elements 911. A cutting wheel 921 is disposed on the movable base 92. When the user rotates the rotatable knob 93, the work piece 80 will be sandwiched by these two rolling elements 911 and the cutting wheel 921. Then, the user rotates the entire mini tube cutter 90 for a circle (rotating 360 degrees). One hand of the user can hold the mini tube cutter 90 and the other hand's fingers of the user can force the rotatable knob 93 rotating in order to feed the cutting wheels 921 in. After which, the user continues to rotate it. Just repeating the above-mentioned steps, the work piece 80 will be cut eventually. Its cutting edge remains circular, so this work piece 80 still can be used for connecting other tube or device.

However, if the user operates this kind of mini tube cutter 90 for a long time, the fingers might be injured. For a harder work piece, the user has to apply larger force via fingers. Under such circumstance, it is very hard to rotate or it cannot rotate. This will cause another problem.

In addition, if the size.of the work piece 80 is too large, there will be no mini tube cutter 90 available. The user has to use other type heavy and complex manual tube cutter (sot shown), but it needs a larger space around the work piece 80 for rotating operation. Otherwise, the user must detach the work piece 80 and then brings it down to a cutting machine somewhere. Thus, larger work piece 80 will cause many other problems.

Therefore, the inventor utilizes the basic principle from the switchable ratchet wrench 95 (shown in FIG. 3) into the existing mini tube cutter 90. Then, a new product is invented in order to solve above-mentioned problems.

SUMMARY OF THE INVENTION

It is a principal object of the present invention to provide a rotatable tube cutter. By utilizing the fixing portion, rotatable portion, cutting blade assembly, and feeding assembly, this invention is easy to operate by one hand.

It is another object of the present invention to provide a rotatable tube cutter that is able to work in a limited space.

It is still another object of the present invention to provide a rotatable tube cutter that is also possible to work by the traditional full circle rotation method.

It is one more object of the present invention to provide a rotatable tube cutter. In which, it has dual feeding modes, namely the manual feeding mode and the automatic feeding modes. In operation, it is more convenient.

BRIEF DESCRIPTION OF THE DRAWINGS

FIG. 1 is a front side view of a conventional tube cutter.

FIG. 2 is a front side view of a conventional tube cutter when it is cutting.

FIG. 3 shows a conventional ratchet wrench in which its rotating direction is changeable.

DESCRIPTION OF THE PREFERRED EMBODIMENT

Figure 4:
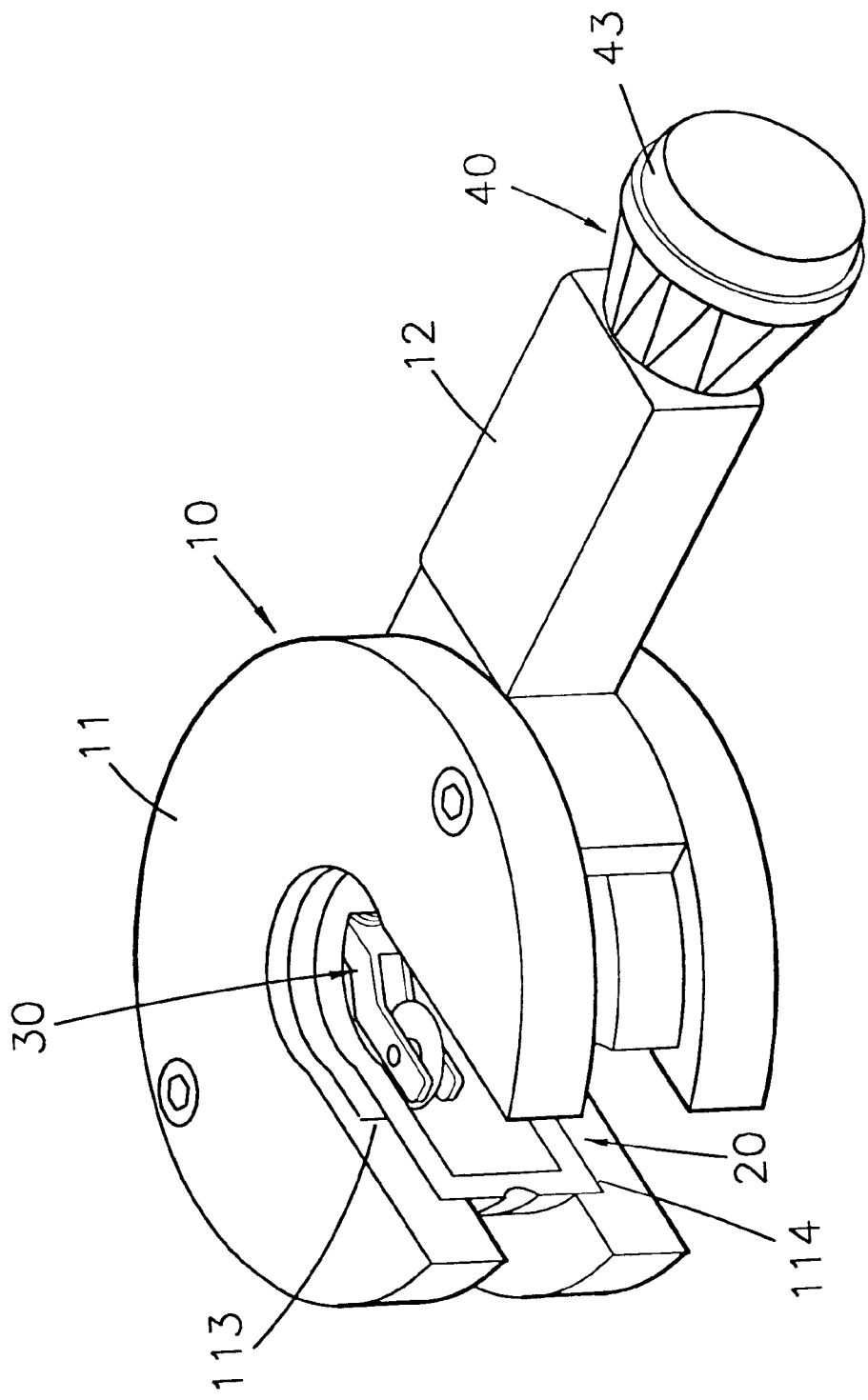
FIG. 4 is a perspective view of the present invention.
Figure 5:
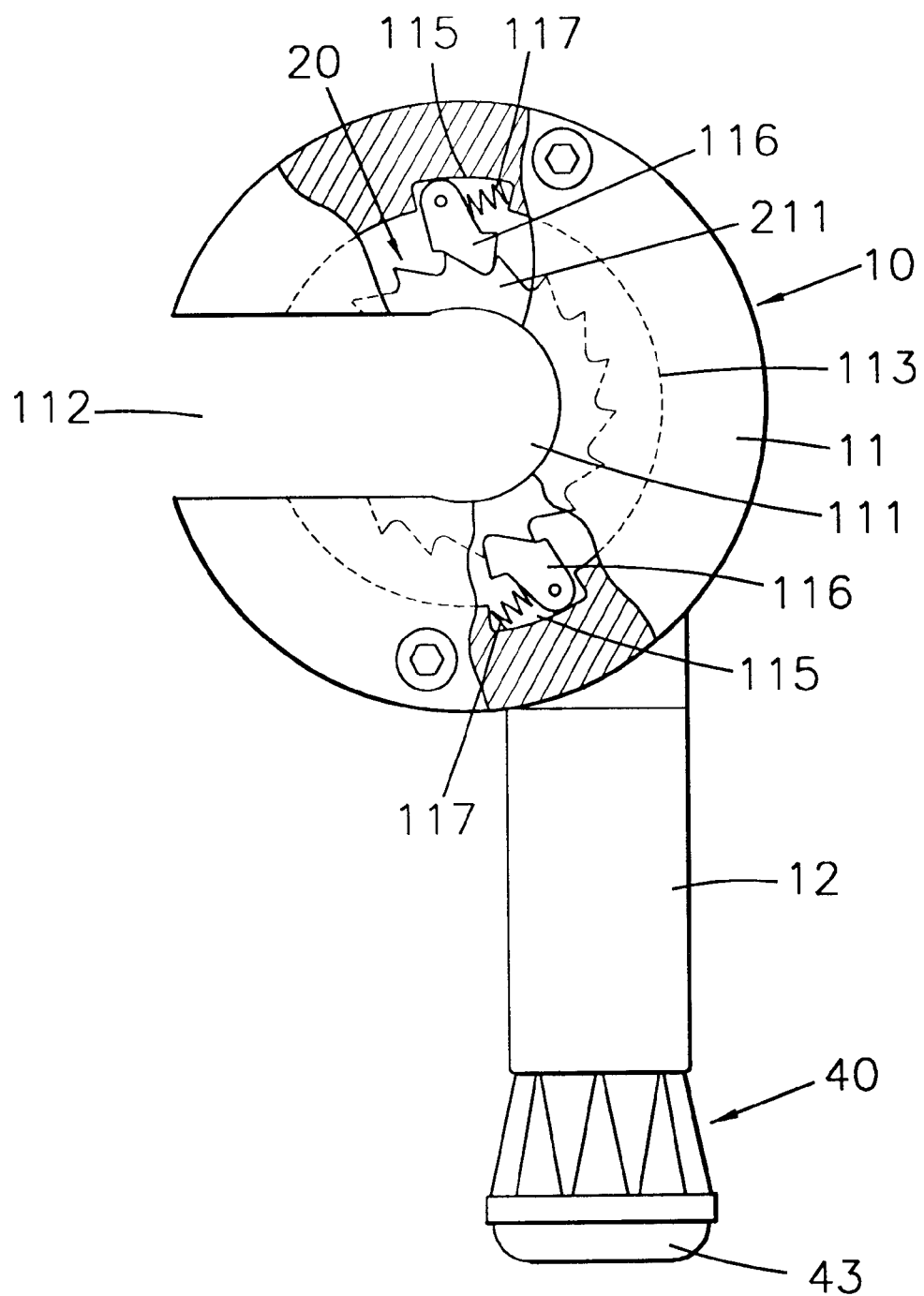
FIG. 5 shows a cross-sectional view of a portion of the present invention.
Figure 6:
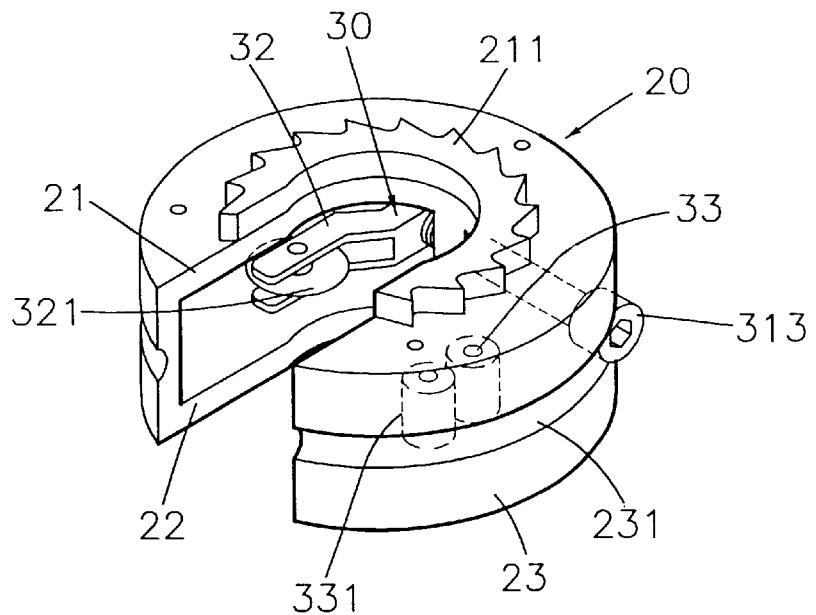
FIG. 6 is a perspective view of the rotatable portion of the present invention.
Figure 7:
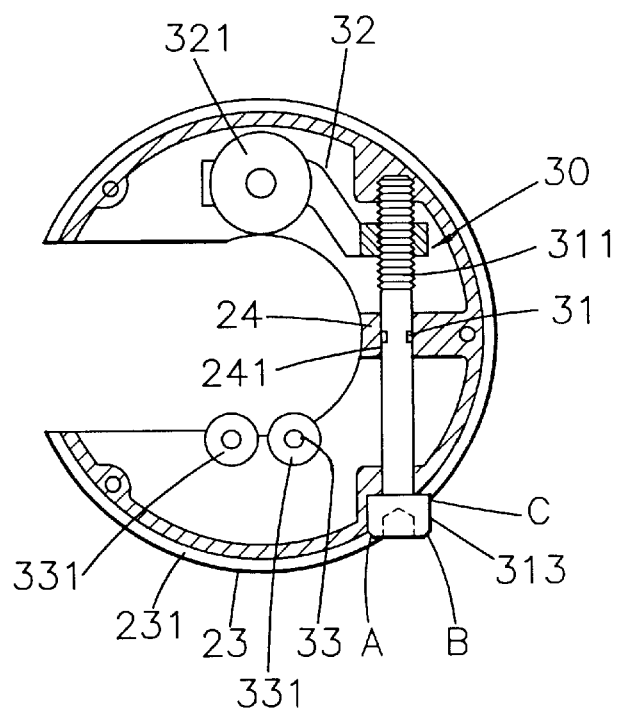
FIG. 7 is cross-sectional view of the rotatable portion of the present invention.

Referring to FIGS. 4 to 9, the present invention relates to a rotatable tube cutter, for cutting a tube-like work piece 80. The rotatable tube cutter mainly comprises a fixing portion 10, a rotatable portion 20, a cutting blade assembly 30, and a feeding assembly 40.

Regarding the fixing portion 10, it is substantially C-shaped. One end of the fixing portion 10 is a casing 11. The other end is disposed with a handle 12. This casing 11 has a central space 111 for receiving the work piece 80 and a recess 112 for connecting the central space 111 with an outer space. A first guiding slot 113 and a second guiding slot 114 are disposed on an inner surface of the casing 11. And, the handle 12 has an internal slot 121. A positioning section 122 is disposed in a predetermined position within this internal slot 121. The first guiding slot 113 has at least two locking cavities 115 spaced apart more than a width of the recess 112. A locking element 116 that is able to rotate an angle and a resilient element 117 (such as a spring) are disposed in the locking cavity 115.

The rotatable portion 20 is also substantially C-shaped and has a first C-shaped casing 21, a second C-shaped casing 22, a curved casing 23 and a fixing rib 24. The first C-shaped casing 21 is disposed with a C-shaped ratchet teeth portion 211. The first C-shaped casing 211 and the C-shaped ratchet teeth portion 211 are slidably fitted on a first guiding slot i13 of the fixing portion 10. The second C-shaped casing 22 is slidably fitted on a second guiding slot 114 of the fixing portion 10. The C-shaped ratchet teeth portion 211 engages with at least one locking element 116 so as to limit the rotatable portion 20 to rotate along one preset direction. A supporting hole 241 is disposed on the fixing rib 24. And, the curved casing 23 has a guiding slot 231 and a receiving portion 232.

About this cutting blade assembly 30, it includes a rotating shaft 31 supported by the supporting hole 241, a cutting blade seat 32, and a roller seat 33. The rotating shaft 31 has a threaded portion 311 and a clutching seat 313 locating within the receiving portion 232. The cutting blade seat 32 engages with the threaded portion 311. A disk-like rolling blade 321 is disposed on the cutting blade seat 32. A cooperating portion 331 is pivotally disposed on the roller seat 33 of the fixing portion 10 to cooperate with the rolling blade 231. Practically, the cooperating portion 331 can be a pair of rollers or a V-shaped low-frictional seat (not shown).

The feeding assembly 40 has a clutching rod 41 that is disposed in the internal slot 121, a clutching resilient element 42 (such as spring, pneumatic element, etc.) installed in the positioning section 122 and a feeding knob 43 disposed on an outer end of the handle 12. One end of the clutching rod 41 is defined as a clutching end 411 with a polygonal cross-section. The other end is disposed with the feeding knob 43. A pushing plate 412 is disposed on the clutching rod 41 so as to resist or push the clutching resilient element 42. Therefore, when the clutching end 411 of the clutching rod 41 engages into the rotating seat 313 of the cutting blade assembly 30 and the feeding knob 43 is rotated by a user, a gap between the rolling blade 321 and the cooperating portion 331 is controlled.

Figure 8:
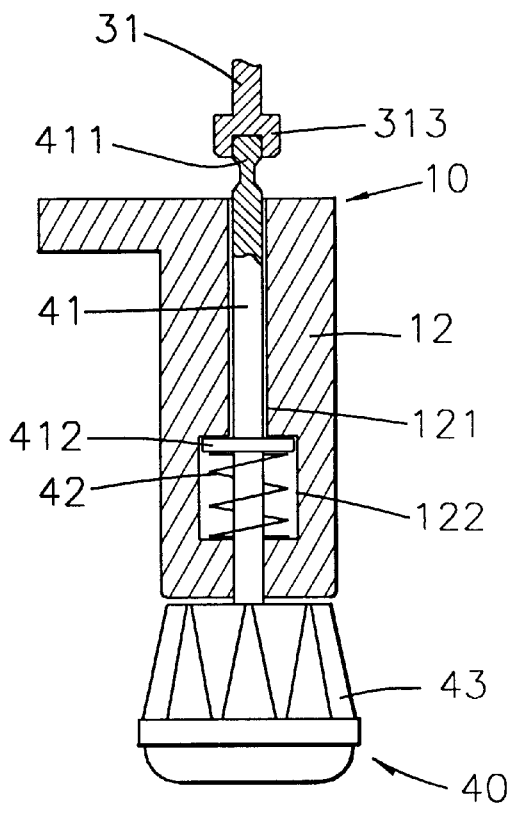
FIG. 8 shows this invention's clutching rod is engaged.
Figure 9:
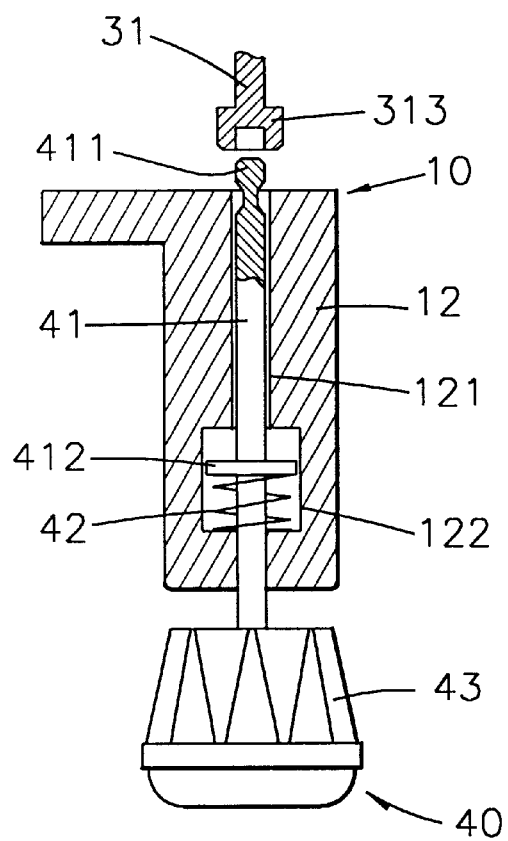
FIG. 9 shows this invention's clutching rod is disengaged.

With regard to the detailed clutching movement, it can be seen in FIGS. 8 and 9. In FIG. 8, the clutching end 441 of the clutching rod 41 just engages into the rotating seat 31 3 of the cutting blade assembly 30. At this moment, if a user rotates this feeding knob 43, the feeding distance of the rolling blade 321 can be easily controlled. If the user holds the feeding knob 43 and draw back a short distance, the clutching end 411 and the rotating seat 313 will be separated, as shown in FIG. 9.

For the actual operation of this invention, please see FIGS. 10A, 10B, 10C, 10D, 10E, 10F, 10G and 10H. First, referring to FIG. 10A, the user use one of his/her hands to hold the handle 12 and to locate the work piece 80 inside the central space 111.

Figure 10A:
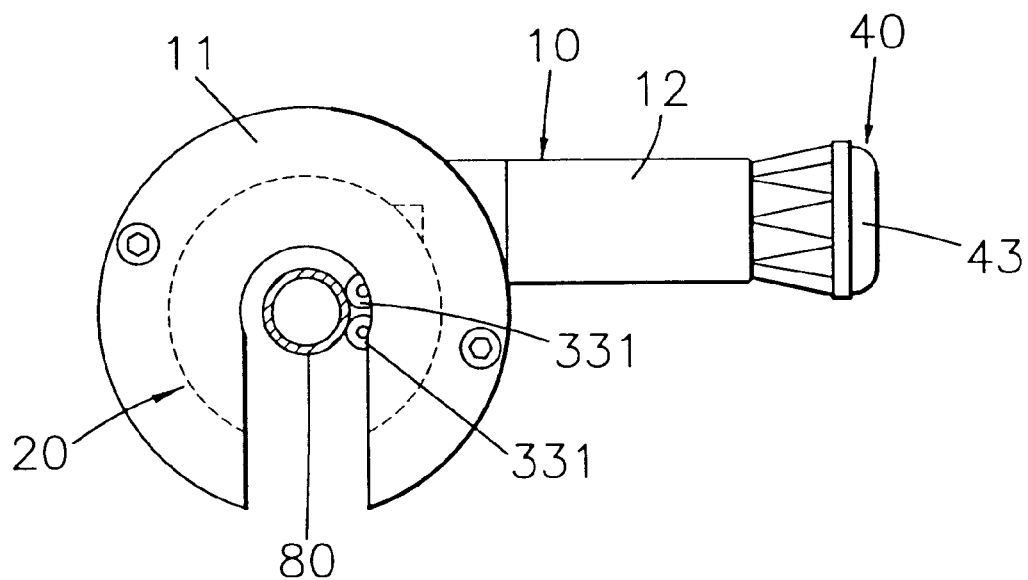
FIGS. 10A, 10B, 10C, 10D, 10E, 10F, 10G and 10H shows the invention at different operation conditions.
Figure 10B:
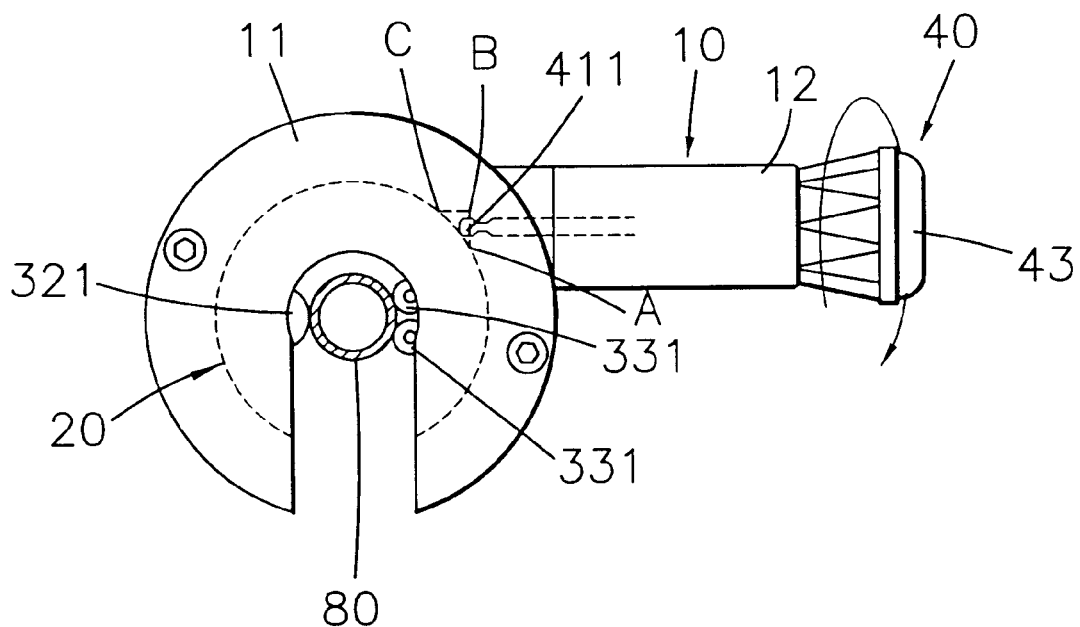

Referring to FIG. 10B, the user's single hand slightly rotates feeding knob 43 of the feeding assembly 40 with a small feeding distance several times so that cutting blade seat 32 of the cutting blade assembly 30 will move toward the roller seat 33. Finally, the rolling blade 321 of the cutting blade assembly 30 and the cooperating portion 331 on the roller seat 33 will contact the outer surface of the work piece 80. Then, apply a suitable feed distance so the rolling blade 321 will cut into this work piece 80 with a suitable feeding amount.

Figure 10C:
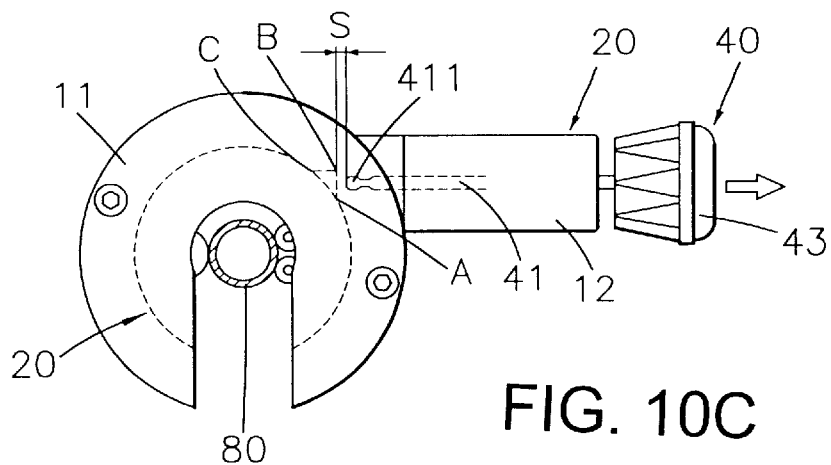

As shown in FIG. 10C, the user's hand holds on the feeding knob 43 to move backward. So, the clutching end 411 of the clutching rod 41 will disengage with the rotating seat 313 of the cutting blade assembly 30 for a short distance S. Thus, they are separated.

Figure 10D:
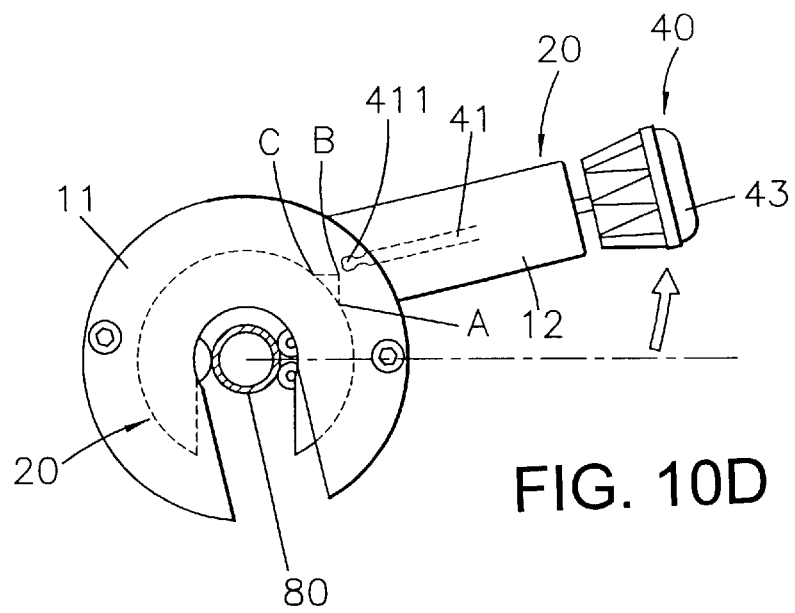

Furthermore, referring to FIG. 10D, the user' hand holds on the feeding knob 43 (still keep backward) and lift up an angle to make the clutching end 411 of the clutching rod 41 pass over the point B of the rotating seat 313 and move toward to point C.

Figure 10E:
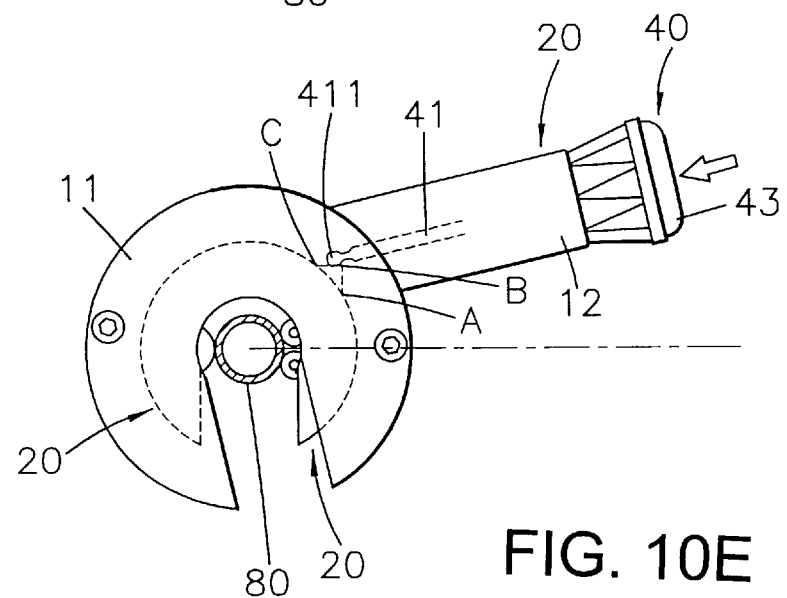

Referring to FIG. 10E, the user's hand releases. Due to the pushing force of the clutching resilient element 42, the feeding knob 43 will return to its original position. Also, the clutching end 411 of the clutching rod 41 disengages with the rotating seat 313 and then slides into the guiding slot 231 (near point C) of the guiding slot 231 on the curved casing 23 of the rotatable portion 20.

Figure 10F:
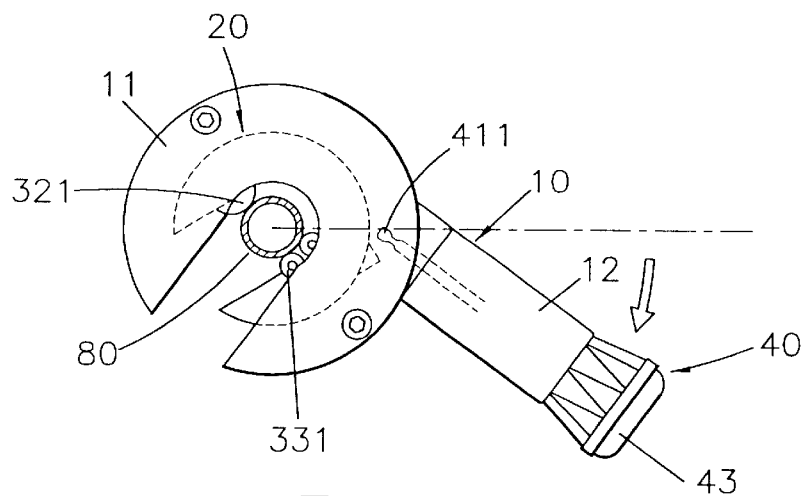

As shown in FIG. 10F, the user's hand presses down another angle. This angle depends on the working space available. If there are a lot of blocks or it is in a limited space, this angle will be smaller. The user rotates the handle 12 down about an angle. Because the locking element 116 (refer to FIG. 5) of the fixing portion 10 engages with the C-shaped ratchet teeth portion 211 (also refer to FIG. 5) of the rotatable portion 20, the entire rotatable portion 20 and the fixing portion 10 are locked together. They will rotate the same angle synchronously. At this time, some portion of the outer surface of the work piece 80 will be cut accordingly.

Figure 10G:
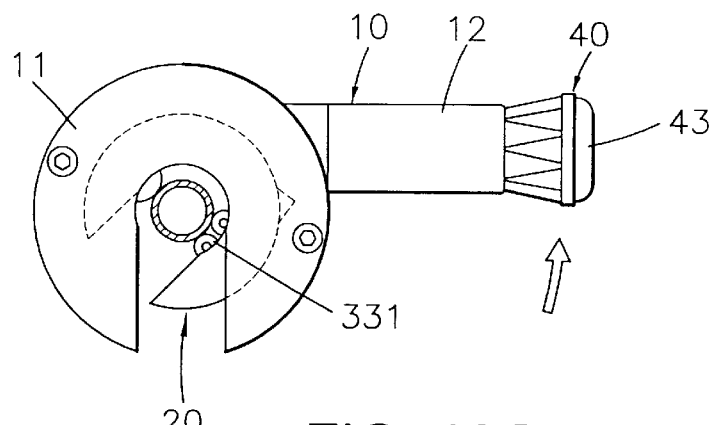

Referring to FIG. 10G, the user's hand moves up to it original horizontal state. Because the locking element 116 (see FIG. 5) of the fixing portion 10 does not engage with the C-shaped ratchet teeth portion 211 (see FIG. 5) of the rotatable portion 20, the rotatable portion 20 will not move but the fixing portion 10 will rotate to the horizontal state.

Figure 10H:
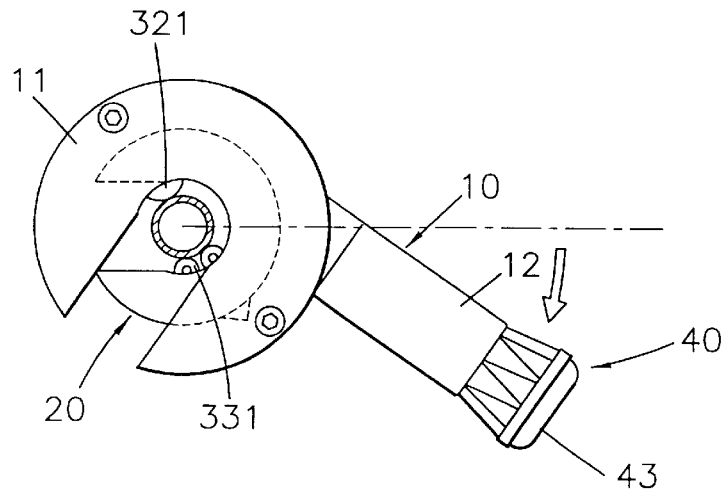
Figure 11:
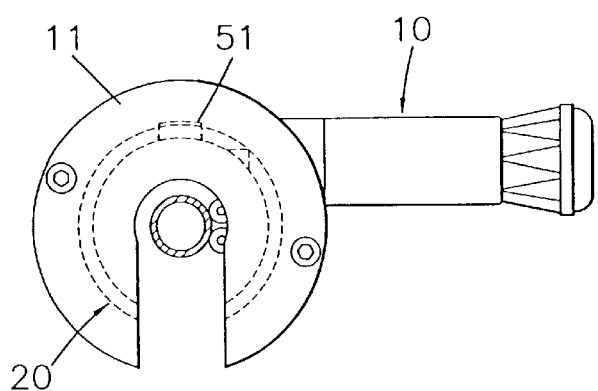
FIG. 11 is a front side view of the second preferred embodiment of the present invention.

As shown in FIG. 10H, the user's hand presses down once again. For the same reason (because the locking element will lock) described above, the entire rotatable portion 20 and the fixing portion 10 are locked together and rotated an angle synchronously. Thus, the outer surface of the work piece 80 will be cut again.

By repeating the above-mentioned steps, the rotatable portion 20 will rotate one circle (360 degrees). That is, the rolling blade 321 will cut the periphery of the work piece 80 (one circle). This rotating seat 313 will return to the original position near the one shown in FIG. 10B. The clutching end 411 will move along the guiding slot 231 and pass the point A near the rotating seat 313. Finally, it will slide into the rotating seat 313 to engage again. In which, because the point B is more protruded over than point A and the clutching resilient element 42 provides a pushing force, the clutching end 411 will not climb over the point B.

At this time, the user can rotate the feeding knob 43 of the feeding assembly 40 again. Just repeating the above-mentioned steps, the work piece 80 will be smoothly cut out.

In addition, the clutching end 411 can has a polygonal cross-section (such as pentagonal, hexagonal, etc.) with rounded edges. Of course, the corresponding rotating seat 313 will be the same polygonal recess. Therefore, when the clutching end 411 and the rotating seat 313 are not precisely aligned, they still can be slidably engaged.

Figure 12:
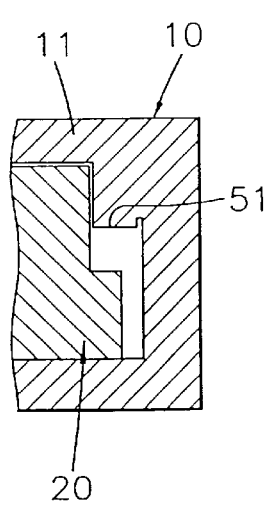
FIG. 12 shows a portion of the inner structure of the second preferred embodiment of the present invention.
Figure 13:
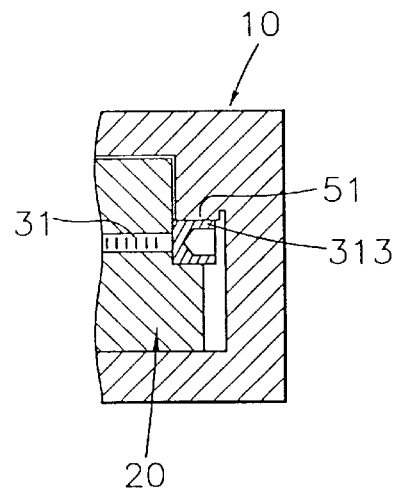
FIG. 13 shows another portion of the inner structure of the second preferred embodiment of the present invention.
Figure 14:
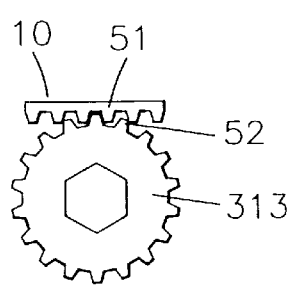
FIG. 14 shows the engaging condition of the second preferred embodiment of the present invention.
Figure 15:
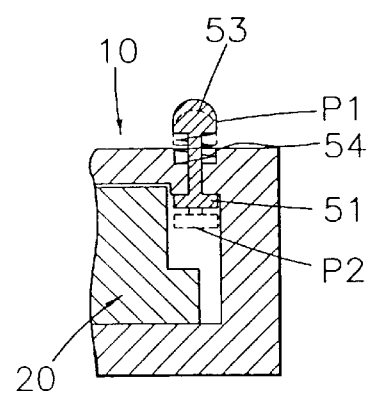
FIG. 15 shows the switching element of the second preferred embodiment of the present invention.

Of course, referring to FIGS. 11 to 15, it is the second preferred embodiment of this invention that can achieve the automatic feeding function. In which, a firth teeth portion 51 (fixed) is disposed on the fixing portion 10. A second teeth portion 52 is disposed on the rotating seat 313 of the rotatable portion 20. Hence, when the rotatable portion 20 rotates a circle, the rotating seat 313 will move along a circular path. If the rotating seat 313 does not move into the zone of first teeth portion 51, it is the condition as shown in FIG. 12. If the rotating seat 313 moves to the zone of first teeth portion 51, it becomes the condition as shown in FIG. 13. The first teeth portion 51 and the second teeth portion 52 will engage together. Also, referring to FIG. 14, the rotating seat 313 will move according so as to drive the rotating shaft rotate. Thus, the automatic feed function is achieved.

Moreover, the first teeth portion 51 can be disposed on a switching element 53. The switching element 53 includes a first position P1 and a second position P2. The first position P1 is defined by the first teeth portion 51 and the second teeth portion 52 are separated forever. That is, this invention is switched to the manual feeding mode. And, the second position P2 is defined by the first teeth portion 51 is engaged with the second teeth portion 52 in a predetermined zone. That is, this invention is switched into the automatic feeding mode.

Of course, the switching element 53 can cooperate with a switching resilient element 54 that automatically forces the switching element 53 to move to its original position.

Besides, if the user wants to maintain the clutching end 411 of the clutching rod 41 and the rotating seat 313 are always separated, the user's hand can draw the feeding knob 43 back and then press down a button (not shown). So, it will lock this clutching rod 41 (for example, to lock on a position near the clutching end 411 or by the pushing plate 412). Thus, the clutching rod 41 is fixed.

In summary, the advantages and functions of this invention can be listed as follows:

(1) Easy one-hand operation. The user only needs to use one hand to operate this invention. In addition, the feeding and drawing movements can be done by easy rotation of one hand. Thus, it avoids the painful rotating by fingers for feeding. This invention provides the revolutionary ease of use and comfortable operation.

(2) Able to work in a limited space. Once the work piece is located inside this invention, if there are ground or wall, the remaining space becomes limited (perhaps only slightly larger than is 90 degrees rotation allowed). But, this invention still can cut the work piece by repeating several small-angle movements. So, it is able to work in a limited space.

(3) Possible to work by the traditional full circle rotation method. When the space is large enough and the user does not choose the clutching function, it still can work well to cut the work piece. Thus, this invention also has the benefits of the traditional one.

(4) Having manual and automatic dual feeding modes. When the related feeding assembly is disposed on this invention, it can switch to either manual feeding mode or automatic feeding mode. Thus, it is more convenient in operation.

The above embodiments are only used to illustrate the present invention, not intended to limit the scope thereof. Many modifications of the above embodiments can be made without departing from the spirit of the present invention.

I claim:

1. A rotatable tube cutter, for cutting a tube-like work piece, said rotatable tube cutter comprising:

a fixing portion, one end of said fixing portion being a casing, the other end of said fixing portion being disposed with a handle, said casing having a central space for receiving said work piece and a recess for connecting said central space with an outer space, a first guiding slot and a second guiding slot being disposed on an inner surface of said casing, and said handle having an internal slot, a positioning section being disposed in a predetermined position within said internal slot, said first guiding slot having at least two locking cavities spaced apart more than a width of said recess, a locking element that is able to rotate an angle and a resilient element being disposed in said locking cavity;

a rotatable portion having a first C-shaped casing, a second C-shaped casing, a curved casing and a fixing rib, said first C-shaped casing being disposed with a C-shaped ratchet teeth portion, said first C-shaped casing and said C-shaped ratchet teeth portion being slidably fitted on a first guiding slot of said fixing portion, said second C-shaped casing being slidably fitted on a second guiding slot of said fixing portion, said C-shaped ratchet teeth portion engaging with at least one locking element so as to limit said rotatable portion to rotate along one direction, a supporting hole being disposed on said fixing rib, and said curved casing having a guiding slot and a receiving portion;

a cutting blade assembly including a rotating shaft supported by said supporting hole, a cutting blade seat, and a roller seat; said rotating shaft having a threaded portion and a clutching seat locating within said receiving portion, said cutting blade seat engaging with said threaded portion, a disk-like rolling blade being disposed on said cutting blade seat, a cooperating portion being pivotally disposed on said roller seat to cooperate with said rolling blade; and a feeding assembly having a clutching rod disposed in said internal slot, a clutching resilient element installed in said positioning section and a feeding knob disposed on an outer end of said handle; one end of said clutching rod being a clutching end, a feeding knob disposed on the other end of said clutching rod, a pushing plate being disposed on said clutching rod so as to resist said clutching resilient element; wherein when said clutching end of said clutching rod engages into said rotating seat of said cutting blade assembly and said feeding knob is rotated by a user, a gap between said rolling blade and said cooperating portion is controlled.

2. The rotatable tube cutter as claimed in claim 1, wherein said clutching end of said clutching rod has a polygonal cross-section, and said rotating seat is a corresponding polygonal recess.

3. The rotatable tube cutter as claimed in claim 1, wherein a firth teeth portion is disposed on said fixing portion, a second teeth portion is disposed on said rotating seat of said rotatable portion; so that when the rotating seat moves to a zone of said first teeth portion, said first teeth portion and said second teeth portion will engage together, and said rotating seat will move accordingly so as to drive said rotating shaft rotate.

4. The rotatable tube cutter as claimed in claim 1, wherein the first teeth portion is disposed on a switching element, said switching element includes a first position and a second position; said first position is defined by said first teeth portion and said second teeth portion are separated, and said second position is defined by said first teeth portion engages with said second teeth portion in a predetermined zone.

5. The rotatable tube cutter as claimed in claim 4, wherein it further comprises a switching resilient element that automatically forces said switching element to move to its original position.

* * * * *